US010725060B2

(12) United States Patent
Chang et al.

(10) Patent No.: US 10,725,060 B2
(45) Date of Patent: Jul. 28, 2020

(54) IMAGE-BASED TRAY ALIGNMENT AND TUBE SLOT LOCALIZATION IN A VISION SYSTEM

(71) Applicant: Siemens Healthcare Diagnostics Inc., Tarrytown, NY (US)

(72) Inventors: Yao-Jen Chang, Princeton, NJ (US); Patrick Wissmann, Munich (DE); Wen Wu, Kirkland, WA (US); Guillaume Dumont, Paris (FR); Benjamin Pollack, Jersey City, NJ (US); Terrence Chen, Princeton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 384 days.

(21) Appl. No.: 15/551,569

(22) PCT Filed: Feb. 16, 2016

(86) PCT No.: PCT/US2016/018100
§ 371 (c)(1),
(2) Date: Aug. 16, 2017

(87) PCT Pub. No.: WO2016/133919
PCT Pub. Date: Aug. 25, 2016

(65) Prior Publication Data
US 2018/0045747 A1 Feb. 15, 2018

Related U.S. Application Data
(60) Provisional application No. 62/117,912, filed on Feb. 18, 2015.

(51) Int. Cl.
G01N 35/00 (2006.01)
G06T 7/73 (2017.01)
(Continued)

(52) U.S. Cl.
CPC . *G01N 35/00732* (2013.01); *G01N 35/00693* (2013.01); *G01N 35/04* (2013.01);
(Continued)

(58) Field of Classification Search
CPC ... G01N 35/00732; G01N 2035/00772; G01N 2035/00811; G01N 35/00693;
(Continued)

(56) References Cited

U.S. PATENT DOCUMENTS 5,138,868 A     8/1992   Long
5,735,387 A *   4/1998   Polaniec ................ G01N 35/04
                                                                                                       198/465.1
(Continued)

FOREIGN PATENT DOCUMENTS

CN         1893809 A     1/2007
CN    103808255 A     5/2014
(Continued)

OTHER PUBLICATIONS

Extended EP Search Report dated Jan. 29, 2018 of corresponding European Application No. 16752915.5, 4 Pages.
(Continued)

*Primary Examiner* — Robert R Raevis

(57) ABSTRACT

A method of tube slot localization is provided using a tray coordinate system and a camera coordinate system. The method includes receiving, a series of images from at least one camera of a tray comprising tube slots arranged in a matrix of rows and columns. Each tube slot is configured to receive a sample tube. The method also includes automatically detecting fiducial markers disposed on cross sectional areas between the tube slots on the tray and receiving an encoder value indicating when each row of the tray is substantially at the center of the camera's field of view. The method further includes determining calibration information
(Continued)

to provide mapping of locations from the tray coordinate system to locations from the camera coordinate system and automatically aligning the tray based on the encoder value and calibration information.

20 Claims, 14 Drawing Sheets

(51) Int. Cl.
*G01N 35/04* (2006.01)
*G06T 7/00* (2017.01)

(52) U.S. Cl.
CPC .............. *G06T 7/0012* (2013.01); *G06T 7/73* (2017.01); *G06T 7/75* (2017.01); *G01N 2035/00772* (2013.01); *G01N 2035/00851* (2013.01); *G01N 2035/0418* (2013.01); *G06T 2207/10016* (2013.01); *G06T 2207/30024* (2013.01); *G06T 2207/30208* (2013.01)

(58) Field of Classification Search
CPC .............. G01N 35/00594; G01N 35/04; G01N 2035/0418; G01N 2035/00851; G06T 7/75; G06T 7/70; G06T 7/0012; G06T 2207/30024; G06T 2207/30208; G06T 2207/10016; G01T 7/73; G01T 7/74
USPC ......... 73/863.01, 1.79, 1.81, 864.21–864.25, 73/64.56; 348/61, 94, 95, 135–142; 422/407, 63–67, 500, 560, 551–553
See application file for complete search history.

(56) References Cited

U.S. PATENT DOCUMENTS

| | | | |
|---|---|---|---|
| 6,055,487 | A | 4/2000 | Margery et al. |
| 8,294,759 | B2 | 10/2012 | Kikuchi et al. |
| 8,428,393 | B2 | 4/2013 | Kraft |
| 8,773,530 | B2 | 7/2014 | Ding et al. |
| 2001/0033414 | A1* | 10/2001 | Yahiro .................. B01L 3/5085 359/383 |
| 2002/0198677 | A1 | 12/2002 | Torre-Bueno et al. |
| 2004/0223661 | A1 | 11/2004 | Kraft |
| 2012/0013875 | A1 | 1/2012 | Geraets et al. |
| 2014/0373747 | A1 | 12/2014 | Yagci et al. |
| 2014/0374480 | A1 | 12/2014 | Pollack |
| 2017/0235984 | A1* | 8/2017 | Opalsky ............. G06K 7/10732 235/462.24 |

FOREIGN PATENT DOCUMENTS

| | | |
|---|---|---|
| CN | 104260112 A | 1/2015 |
| JP | 2014-078139 A | 5/2014 |
| WO | 02/072867 A2 | 9/2002 |
| WO | 2014/152329 A1 | 9/2014 |

OTHER PUBLICATIONS

PCT International Search Report and Written Opinion dated Apr. 11, 2016 (10 Pages).

* cited by examiner

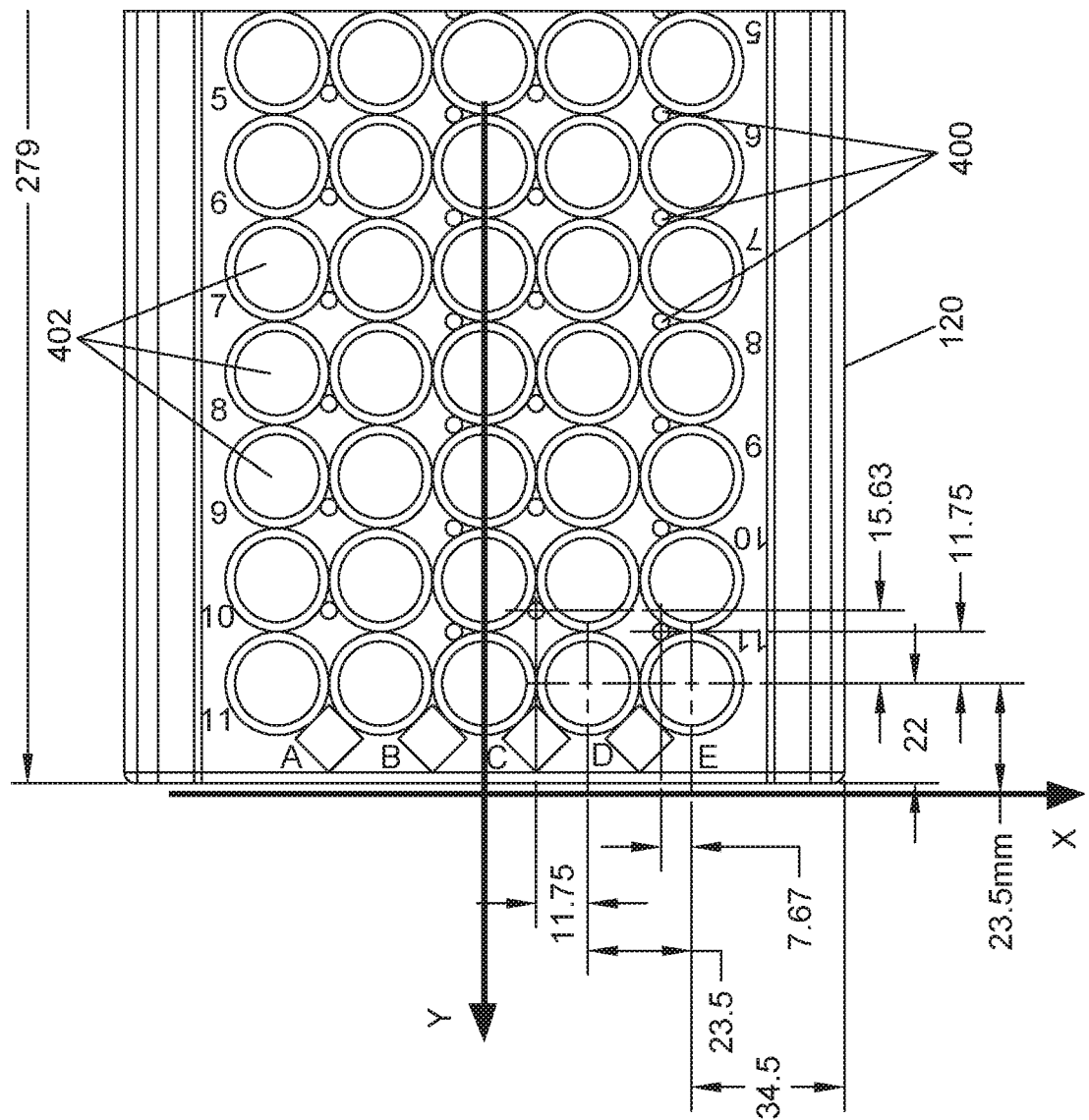

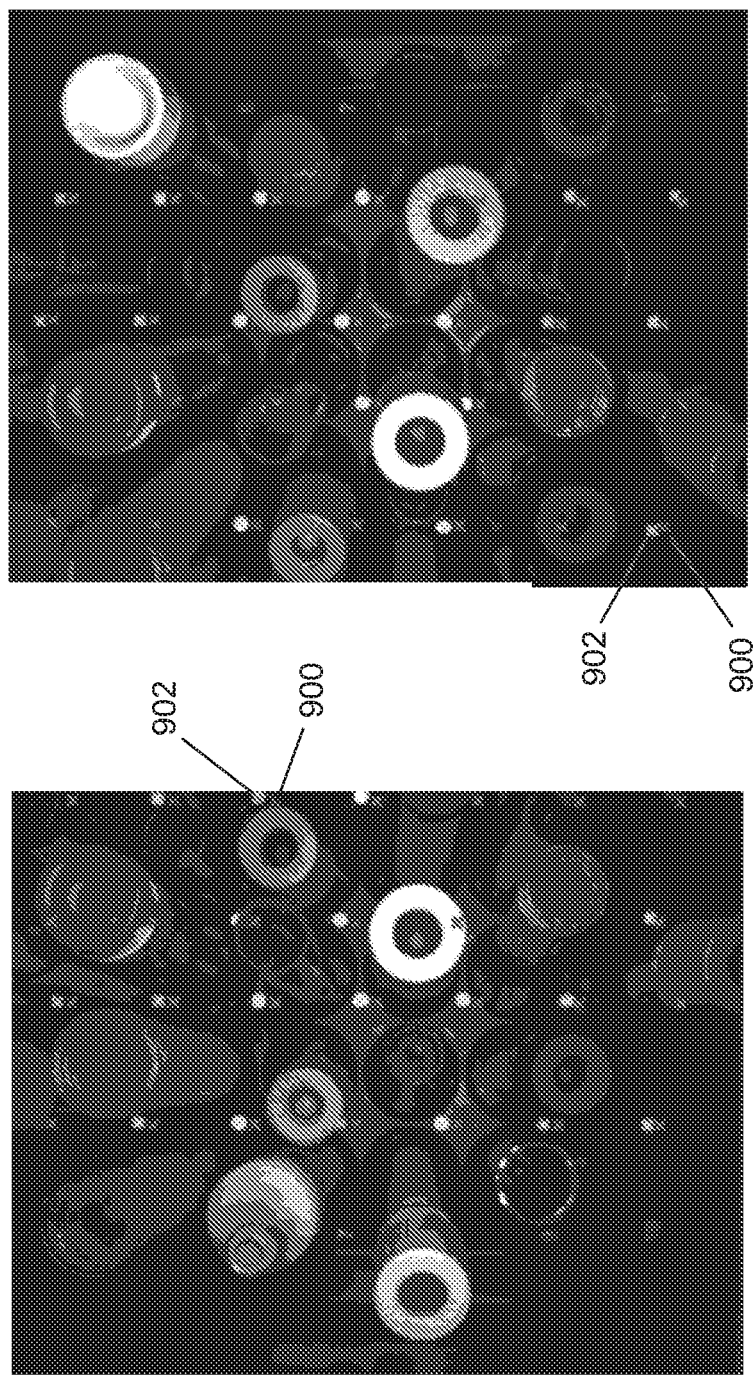

IMAGE-BASED TRAY ALIGNMENT AND TUBE SLOT LOCALIZATION IN A VISION SYSTEM

RELATED APPLICATION

This application claims priority to U.S. Provisional Application Ser. No. 62/117,912 entitled "IMAGE-BASED TRAY ALIGNMENT AND TUBE SLOT LOCALIZATION IN A VISION SYSTEM" filed on Feb. 18, 2015, the disclosure of which is hereby incorporated by reference in its entirety herein.

TECHNOLOGY FIELD

The embodiments disclosed herein relate in general to capturing images of a tube tray to determine characteristics of the tray and tubes held within the tray and, more particularly, to using fiducial markers to calibrate and align the tray for accurate determination of the characteristics of the tray and tubes held within the tray.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) into which tubes or vials containing patient samples have been loaded. Because of the variety of assays needed in a modern IVD lab, and the volume of testing necessary to operate a lab, multiple analyzers are often employed in a single lab. Between and amongst analyzers, automation systems may also be used. Samples may be transported from a doctor's office to a lab, stored in the lab, placed into an automation system or analyzer, and stored for subsequent testing.

Storage and transport between analyzers is typically done using trays. A tray is typically an array of several patient samples stored in test tubes. These trays are often stackable and facilitate easy carrying of multiple samples from one part of the laboratory to another. For example, a laboratory may receive a tray of patient samples for testing from a hospital or clinic. That tray of patient samples can be stored in refrigerators in the laboratory. Trays of patient samples can also be stored in drawers. In some automation systems, an analyzer can accept a tray of patient samples and handle the samples accordingly, while some analyzers may require that samples be removed from trays by the operator and placed into carriers (such as pucks) before further handling. Trays are generally passive devices that allow samples to be carried and, in some cases, arranged in an ordered relationship.

Generally, information about sample tubes stored in a tray is not known until an operator or sample handling mechanism interacts with each tube. For example, a sample handling robot arm may pick up a tube, remove it from the tray, and place it into a carrier. The carrier can then travel to a decapper station to remove any possible cap and pass by a barcode reader so that a barcode on the side of the tube can be read to reveal the contents of the tube. In many prior art sample handling mechanisms, the identity of the tube is not known until after the tube is removed from the tray. In this manner, all tubes in a tray will often be handled the same way until after a tube is placed onto a carrier in an automation system.

SUMMARY

Embodiments provide a method of tray calibration using a tray coordinate system having an x-axis and a y-axis and a camera coordinate system having an x-axis and a y-axis. The method includes acquiring an image of a tray comprising a plurality of tube slots arranged in a matrix of rows and columns. Each tube slot configured to receive a sample tube, the image of the tray being acquired via a camera. The method also includes detecting, using a processor, a plurality of fiducial markers disposed on cross sectional areas between the tube slots on the tray and pre-aligning the tray coordinate system with the camera coordinate system. The method further includes calculating, using the processor, a tray grid by fitting parallel lines to positions of markers along their x-coordinates of the tray coordinate system and fitting pairs of parallel lines to positions of the markers on each row along their y-coordinates of the tray coordinate system and calibrating, using the processor, the tray by identifying a correspondence of each detected fiducial marker to a physical position on the tray to provide mapping of the tray coordinate system to the camera coordinate system.

According to an embodiment the tray is configured to fit within a portion of a drawer movable between an open position and a closed position and the image of the tray is acquired via the camera as the drawer is moved between the open and the closed position.

According to another embodiment, the method further includes acquiring another image of the tray via another camera adjacent the camera and having another camera coordinate system, pre-aligning the tray coordinate system with the other camera coordinate system and identifying the correspondence of each detected fiducial marker to the physical position on the tray to provide mapping of the tray coordinate system to the other camera coordinate system.

In yet another embodiment, calculating the tray grid further includes grouping detected markers into clusters along their x-coordinates of the tray coordinate system, wherein the detected markers in each cluster lay in a line in the y-direction of the tray coordinate system which is parallel to the other lines in the y-direction of the tray coordinate system formed by the other clusters.

According to an aspect of an embodiment, the plurality of fiducial markers are white dots.

In one embodiment, calculating the tray grid further includes performing linear regression to fit the parallel lines to positions of the markers along their x-coordinates of the tray coordinate system and to fit the pairs of parallel lines to positions of the markers on each row along their y-coordinates of the tray coordinate system. The cross sectional areas are near diamond shaped areas and fiducial markers on each row of the near diamond shaped area include top corner fiducial markers located at the top corner of alternating diamond shaped areas and right corner fiducial markers located at the right corner of alternating diamond shaped areas.

In another embodiment, the method further includes using the correspondence of each detected fiducial marker to the physical position on the tray to align the tray during online operation.

In yet another embodiment, calibrating the tray further includes deriving a pose of the camera by minimizing re-projection errors according to:

$$R,t = \mathrm{argmin}_{R,t} \Sigma i \| p_i - f(RP_i + t, K_c, d_c) \|^2,$$

where $\{P_i\}$ and $\{p_i\}$ are the 3D and 2D correspondences, $f(\ )$ is the 3D to 2D projection function from camera coordinate system to its image plane, $K_c$ is the intrinsic calibration matrix containing the focal length and skew of the camera axis and the principal point on the image, $d_c$ is its lens distortion vector, and the rotation matrix R and translation vector t are the extrinsic parameters describing the pose of the camera image.

Embodiments provide a method of tube slot localization using a tray coordinate system and a camera coordinate system. The method includes receiving, using a processor, a series of images from at least one camera of a tray comprising tube slots arranged in a matrix of rows and columns. Each tube slot is configured to receive a sample tube. The image of the tray is acquired via the at least one camera. The method also includes automatically detecting, using the processor, a plurality of fiducial markers disposed on cross sectional areas between the tube slots on the tray and receiving, using the processor, an encoder value indicating when each row of the tray is substantially at the center of the camera's field of view. The method further includes determining, using the processor, calibration information to provide mapping of locations from the tray coordinate system to locations from the camera coordinate system and automatically aligning, using the processor, the tray based on the encoder value and calibration information.

According to an embodiment, the tray is configured to fit within a portion of a drawer movable between an open and a closed position and the image of the tray is acquired via the at least one camera as the drawer is moved between the open position and the closed position.

According to another embodiment, the calibration information indicates correspondence of each detected fiducial marker to a physical position on the tray.

In yet another embodiment, the calibration information indicates the tray's type, the tray's orientation and the tray's position. Automatically aligning, using the processor, the tray further includes predicting locations of fiducial markers based on the encoder value and the calibration information, automatically determining an offset between the projected locations of the markers and the locations of the detected marker and automatically compensating for the offset to align the tray and tube slots that fall in the at least one camera's field of view.

In one embodiment, the method further includes defining tube slot grid points at the center of each of the cross sectional areas and projecting compensated tube slot grid points onto one or more of the series of images to locate the tube slots based on the determined offset.

In another embodiment, the method further includes extracting data corresponding to each tube slot from one or more of the series of images to determine at least one of: whether a tube occupies one of the tube slots and a tube type.

Embodiments provide a vision system for use in an in vitro diagnostics environment. The system includes a tray having a plurality of tube slots arranged in a matrix of rows and columns. Each tube slot is configured to receive a sample tube. The tray also includes a plurality of cross sectional areas located between the plurality of tube slots and a plurality of fiducial markers disposed on the cross sectional areas. The system also includes a surface configured to receive the tray, at least one camera configured to capture a series of images of the tray positioned on the surface and an encoder configured to generate an encoder value indicating when each row of the tray is substantially at the center of the at least one camera's field of view. The system further includes a processor configured to receive the series of images of the tray from the at least one camera, automatically detect a plurality of fiducial markers disposed on cross sectional areas between the tube slots on the tray, receive the encoder value, generate calibration information to provide mapping of locations from a tray coordinate system to locations from a camera coordinate system and automatically align the tray based on the encoder value and calibration information.

According to an embodiment, the surface comprises a drawer movable between an open and a closed position and the image of the tray is acquired via the at least one camera as the drawer is moved between the open position and the closed position.

According to another embodiment, each cross sectional area is a near diamond shaped area and each near diamond shaped area is disposed between four of the plurality tube slots. The fiducial markers on each row of the near diamond shaped areas include top corner fiducial markers located at the top corner of alternating diamond shaped areas and right corner fiducial markers located at the right corner of alternating diamond shaped areas.

In yet another embodiment, the processor is further configured to determine calibration information to provide mapping of locations from the tray coordinate system to locations from the camera coordinate system by detecting the plurality of fiducial markers disposed on the cross sectional areas between the tube slots on the tray, pre-aligning the tray coordinate system with the camera coordinate system, calculating a tray grid by fitting parallel lines to positions of markers along their x-coordinates of the tray coordinate system and fitting pairs of parallel lines to positions of the markers on each row along their y-coordinates of the tray coordinate system and determining calibrating information by identifying a correspondence of each detected fiducial marker to a physical position on the tray.

Embodiments provide a tray configured to be held on a surface for use with a vision system. The tray includes a plurality of tube slots arranged in a matrix of rows and columns. Each tube slot is configured to receive a sample tube. The tray also includes a plurality of near diamond shaped areas. Each near diamond shaped area is disposed between four of the plurality tube slots. The tray further includes a plurality of fiducial markers. Each fiducial marker is disposed on one of the near diamond shaped areas.

According to an embodiment, fiducial markers on each row of the near diamond shaped areas include top corner fiducial markers located at the top corner of alternating diamond shaped areas and right corner fiducial markers located at the right corner of alternating diamond shaped areas.

According to another embodiment, the tray further includes a plurality of spring force elements. Each spring force element is coupled to a tube slot and configured to exert a force on the sample tube such that the tube is not centered in the tube slot. The fiducial markers are disposed on the tray in a pattern such that at least three fiducial markers adjacent to each one of the tube slots is within a field of view of a camera when a sample tube is in the corresponding tube slot.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following Figures:

FIG. 7A is a diagram illustrating a tray coordinate system superimposed over a top view of an exemplary tray having fiducial markers disposed between slots for use with embodiments;

FIG. 9A and FIG. 9B are exemplary images of a top view of a tube tray and tubes illustrating an offset between projected markers and the detected markers, according to an embodiment;

DESCRIPTION OF EXEMPLARY EMBODIMENTS

Figure 1A:
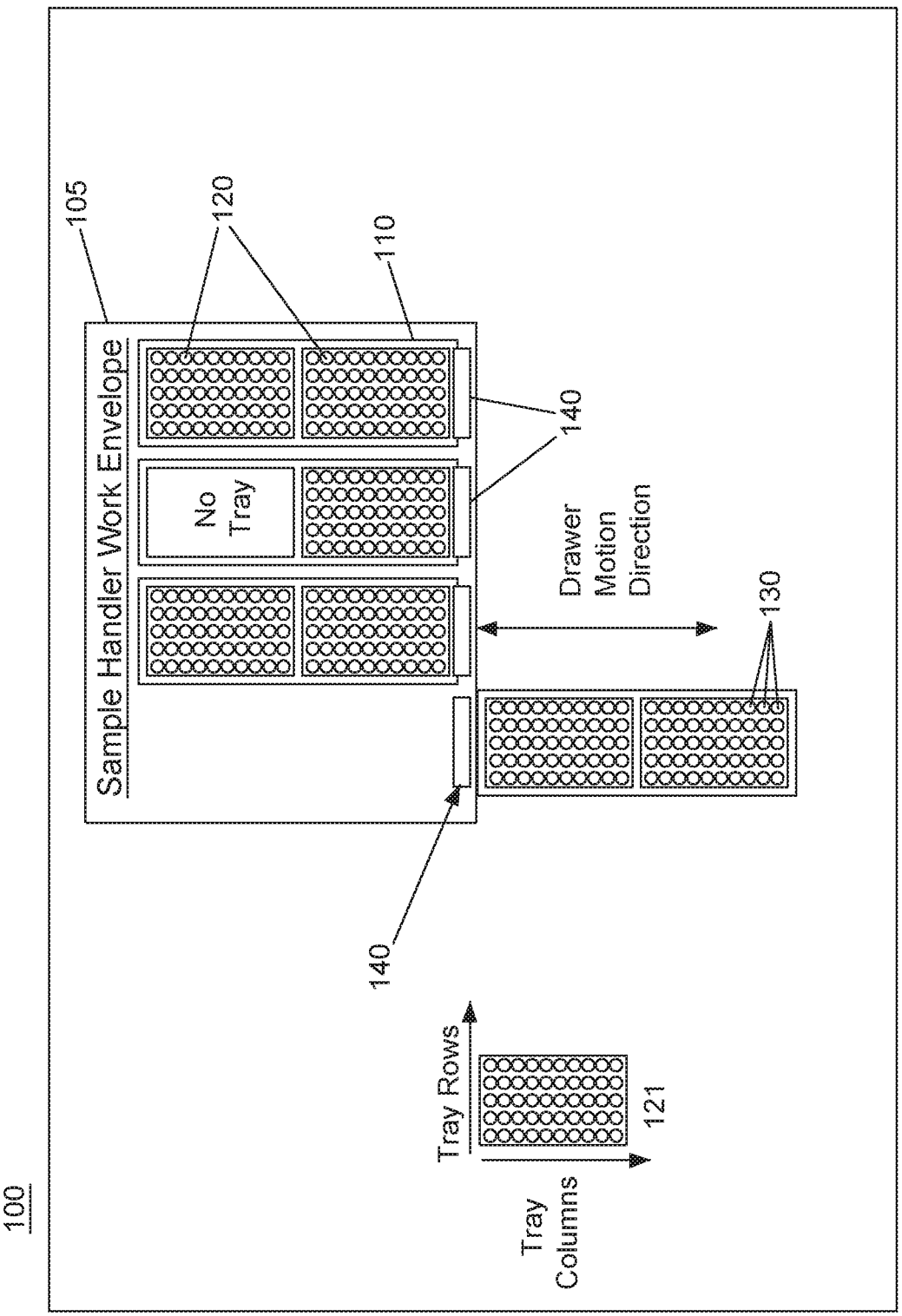
FIG. 1A is a representation of a system for characterizing through image analysis tube trays and tubes held in a drawer, according to an embodiment.

This application relates to several of the concepts described in PCT Application No.: PCT/US14/27217, and U.S. Provisional Application No. 62/010,370 to Wu et al., which are incorporated, herein by reference.

Embodiments include systems and methods for calibration and alignment of tube trays in an automated vision system configured to acquire images of the tube trays and tubes held within the tube trays. Some embodiments include acquiring images of trays that are manually placed and aligned in an automation system. For example, automation systems may provide a flat surface with guide rails and allow the operator to manually align keying features on the trays to the rails and push the trays to the working area.

Some embodiments may include an automated drawer vision system (DVS) comprising a drawer for loading and unloading tube trays on which sample tubes are contained. The images of the trays may be acquired via one or more cameras, mounted above an entrance area of the drawer, as the drawer is moved between an open position and a closed position (e.g., working area position). To facilitate accurate estimation of tube characteristics for images acquired under fast motion, embodiments provide high-precision tube sample tray alignment and tube slot localization by using an image-based method that includes utilizing a set of fiducial markers on the tray surface to estimate a distance a tray has traveled with a drawer for each image. Embodiments also include a calibration method for registering the fiducial marker pattern for each DVS camera. Embodiments further include a template matching method for tray alignment and tube slot localization.

Embodiments include using simple white dots as the fiducial markers which are unique and easy to detect and provide anchor points for robust tray alignment. The low resolution dot pattern may be molded into the top surface of the tray to provide an efficiently manufactured tray with accurate (e.g., dot location very close to CAD model) detection. An efficient and robust low resolution hardware encoder may be used with the fiducial markers for tray alignment. The alignment tolerance between the encoder strip on the drawer and the optical slot sensors on the frame is large, allowing the drawer to move (e.g., bend, flex and extend) without losing encoder counts and eliminating the time and expense of calibrating the encoder system. An encoder strip with optical slot sensors is also robust from the perspective of dirt/dust.

The combination of low resolution dot patterns and low resolution hardware encoder avoids less efficient etching of high resolution complex patterns (e.g., high precision marker placement, complex marker shapes or a large number of markers) that may not be molded into the tray. The combination of low resolution dot patterns and low resolution hardware encoder also avoids the usage of expensive high resolution hardware encoders for tray alignment.

As described in PCT Application No.: PCT/US14/27217, a tube tray of a DVS is configured to fit within a drawer and hold a plurality of tubes in slots that are arranged in an array of rows and columns. The images are used to characterize the tray as well as the tubes held on the tray. In particular, according to embodiments, by analyzing the images, various features of the tubes can be determined, such as, for example, the tray slots containing a tube; a tube's center point in a coordinate system, a tube's diameter and height; the tray's orientation within a drawer; whether a tube is a plain tube, the tube is covered with a cap or tube-top cup; a tube cap's color(s), a barcode on the surface of a tray; and a speed at which a drawer holding the tray is being inserted or removed into the work environment. Embodiments determine this information and other pieces of information quickly, without expensive equipment, and without handling or touching the tubes. Such knowledge allows for an efficient and streamlined processing of the tubes, as well as for reduced setup and maintenance costs.

This information is valuable in an IVD environment in which a sample handler is processing the tubes and moving the tubes to analyzers for testing and analysis. Embodiments of the present invention are particularly well suited for, but in no way limited to, IVD environments.

FIG. 1A is a representation of an exemplary drawer vision system 100 in which tube trays 120 and tubes 130 contained thereon are characterized by obtaining and analyzing images thereof, according to an embodiment of the present invention. One or more drawers 110 are movable between an open and a closed position and are provided in a work envelope 105 for a sample handler. One or more tube trays 120 may be loaded into a drawer 110 or may be a permanent feature of the drawer 110. Each tube tray 120 has an array of rows and columns of slots (as depicted in exemplary tray 121) in which tubes 130 may be held.

According to embodiments, images are taken of a tube tray 120. The images are analyzed to determine characteristics of the tube tray 120 and the tubes 130. A moving-tray/fixed camera approach is used, according to embodiments provided herein, to capture the images for analysis thereof. As the tube tray 120 is moved into the work envelope 105 by, for example, manually or automatically pushing in the drawer 110, an image capture system 140 is used to take images of the tube tray 120 and the tubes 130 contained thereon.

The image capture system 140 may include one or more cameras (e.g., left camera 242 and right camera 244 shown in FIG. 2) positioned at or near the entrance to the work envelope 105. In some embodiments, the one or more cameras 242, 244 may be positioned above the surface of the tube tray 120. For example, the cameras 242, 244 may be placed three to six inches above the surface to capture a high resolution image of the tube tray 120. Other distances and/or positioning may also be used depending on the features of the cameras 242, 244 and the desired perspective and image quality. Optionally, the image capture system 140 may include one or more lighting sources, such as an LED flash.

Figure 1B:
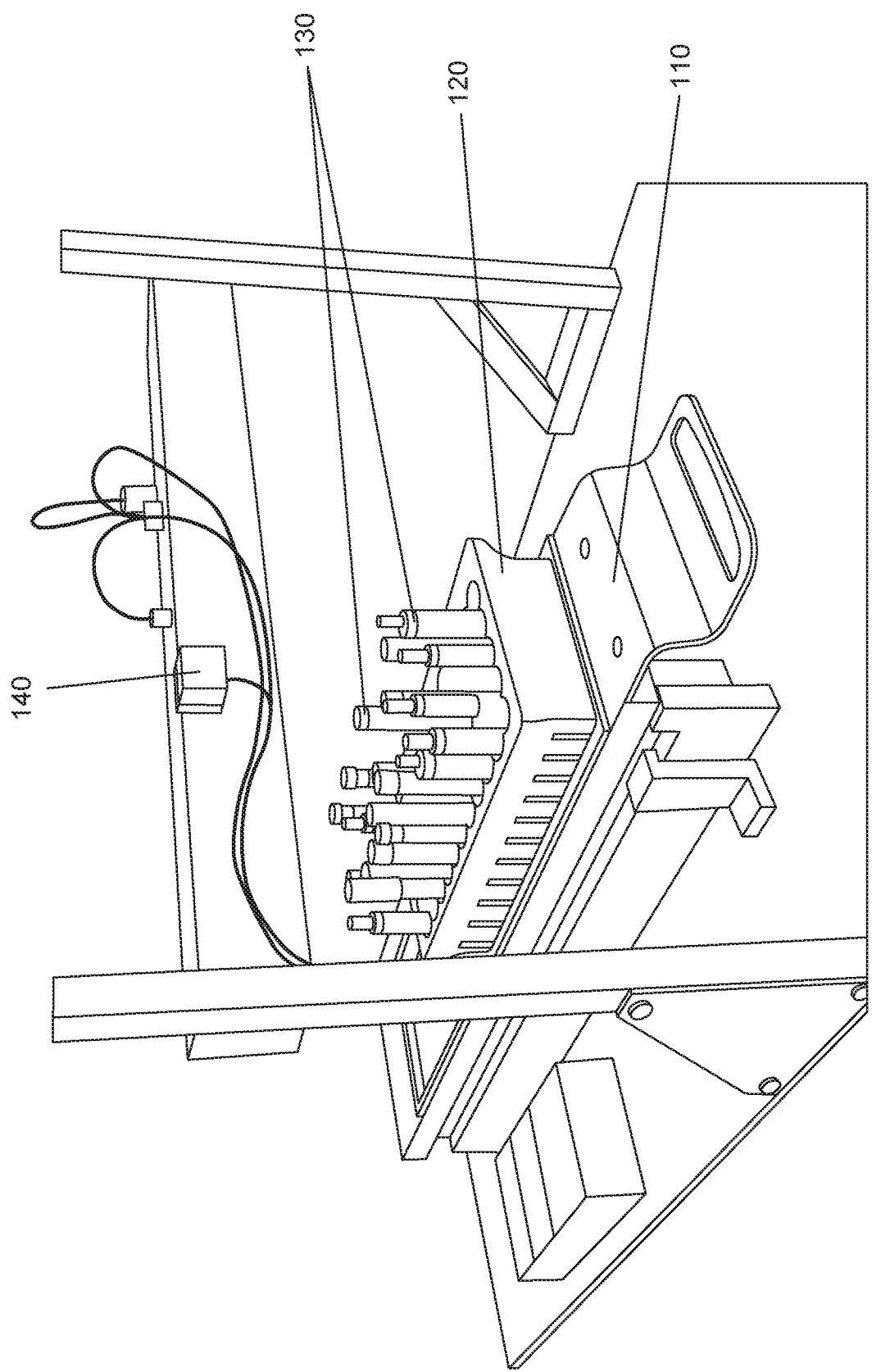
FIG. 1B shows an exemplary drawer vision system test harness including an image capture system positioned above a tube tray disposed on a drawer, according to an embodiment.

FIG. 1B shows an exemplary test harness of an exemplary drawer vision system that may be used with embodiments disclosed herein. As shown in FIG. 1B, image capture system 140 is positioned above the surface of the tube tray 120 holding tubes 130 and disposed on drawer 110. The drawer 110 shown in the embodiment at FIG. 1B is configured to hold two 55-slot trays or six 15-slot trays. Embodiments may, however, include trays configured to hold trays having different numbers of slots and having different sizes.

Figure 2:
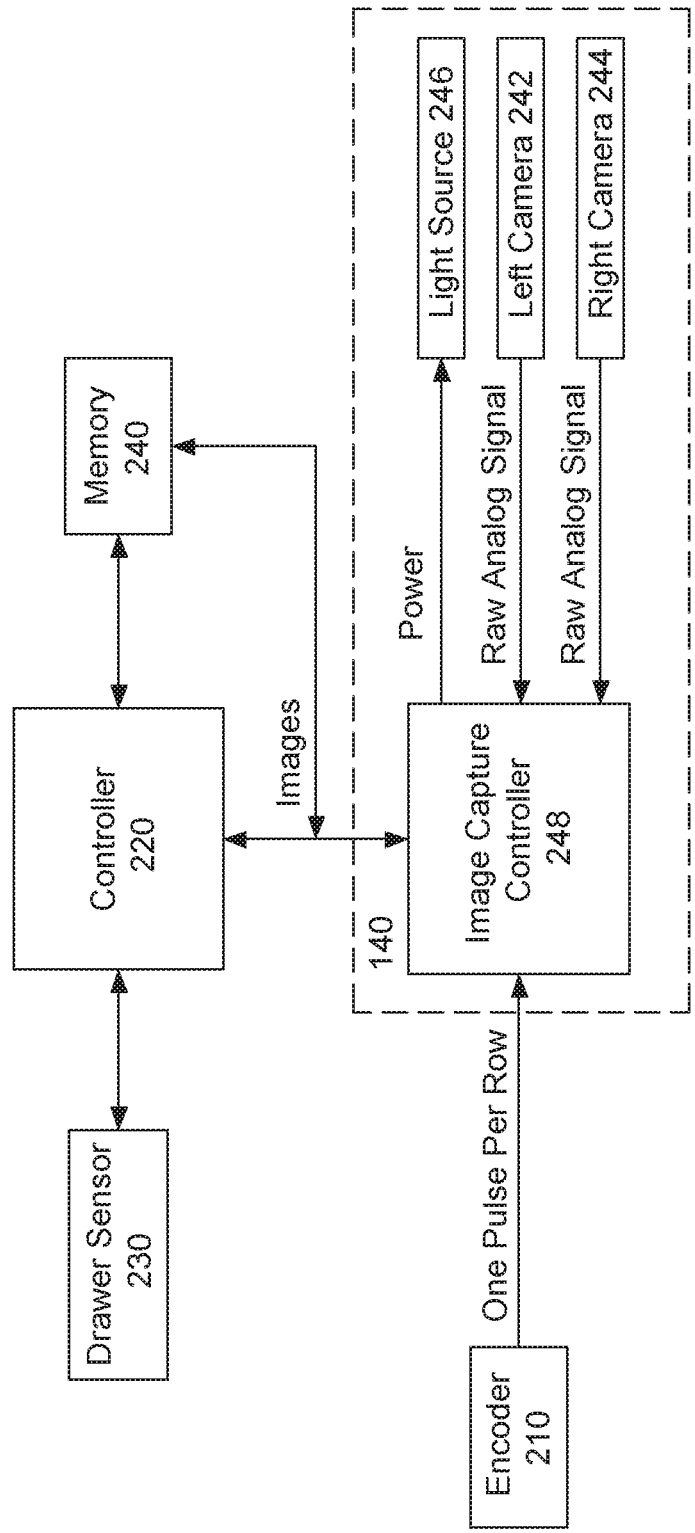
FIG. 2 shows a block diagram representation of a system for characterizing, through image analysis, the tube trays and the tubes contained thereon held in a drawer, according to an embodiment.

FIG. 2 shows a block diagram representation of a system 200 for characterizing, through image analysis, the tube trays 120 and the tubes 130 contained thereon held in a drawer 110, according to an embodiment. The image capture system 140, according to an embodiment, includes two cameras, a left camera 242 and a right camera 244. Additional or fewer cameras may be included depending on the size of the drawers 110 and the tube trays 120, as well as the desired image quality and image perspective. A light source 246 and an image capture controller 248 are also part of the image capture system 140.

An encoder 210, such as a quadrature encoder may be used to determine when a row of the tube tray 120 is moved into a centered or substantially centered position beneath the one or more cameras 242, 244. The encoder 210 transmits a signal (i.e., a pulse) to the image capture controller 248 upon detection of movement of the tube tray 120 corresponding to a new row of the tube tray 120 moving into a centered or substantially centered position beneath the one or more cameras 242, 244. The signal serves as an instruction for the image capture controller 248 to instruct the cameras 242, 244 to take an image upon receipt of the signal.

A controller 220 is provided for managing the image analysis of the images taken by the cameras 242, 244. Upon detection of the closing of the drawer 110, the image capture controller 248 provides the images to the controller 220 for downloading and processing. The controller 220 is, according to an embodiment, part of a sample handler that is used in the IVD environment to handle and move the tube trays 120 and the tubes 130 between storage locations, such as the work envelope 105, to analyzers. The image analysis performed by the controller 220 serves to instruct the sample handler on the various determined characteristics of the tube tray 120 and the tubes 130, thus allowing the sample handler to accordingly handle and process the tube tray 120 and the tubes 130.

The one or more memory devices 240 are associated with the controller 220. The one or more memory devices 240 may be internal or external to the controller 220.

One or more drawer sensors 230 may be connected to the controller 220 to indicate when the drawer 110 is fully closed and/or when the drawer 110 is fully opened. According to an embodiment, the drawer 110 being fully closed serves as an indication to begin image processing of the captured and stored images. When the drawer 110 is fully closed, the drawer sensor 230 sends a signal to the controller 220.

Figure 3:
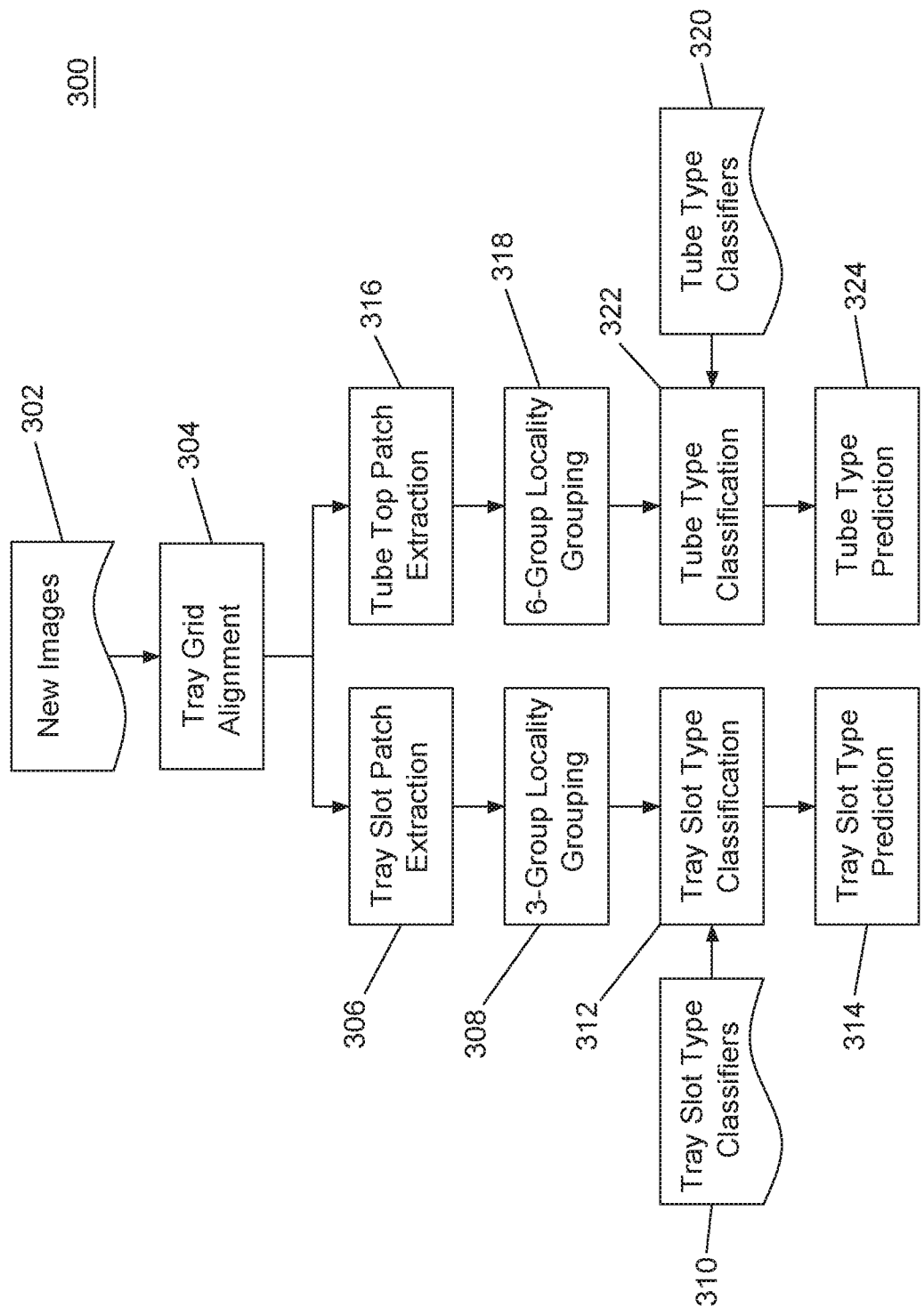
FIG. 3 is a flowchart illustrating a method of detecting properties of sample tubes according to embodiments described herein.

FIG. 3 is a flowchart illustrating a method 300 of determining tray slot types and tube types of sample tubes. As shown in FIG. 3, the method may determine a tray slot type (e.g., whether slot is empty or not empty) via steps 306-314 and/or may determine a tube type (e.g., plain tube, tube with a cap or tube with a tube-top sample cup) via steps 316-324. The method of determining a tray slot type are described in more detail in application No. 62/117,916 entitled "Locality-based Detection of Tray Slot Types and Tube Types in a Drawer Vision System."

After the images are acquired at step 302 and prior to proceeding to step 308 to determine a tray slot type, however, the tray grid is aligned at step 304 and the tray slot patch is extracted at step 306. The following description focuses on the tray grid alignment at step 304 and the tray slot patch extraction at step 306.

Conventional automation systems perform time-consuming brute-force methods for tube slot occupancy detection. These systems lack advanced tube categorization and characterization capabilities. By contrast, the DVS utilizes two cameras mounted on top of the drawer entrance to acquire images of the sample tubes during drawer insertion. Therefore, tube occupancy detection, tube categorization, and tube characterization may be efficiently performed on the acquired images using image analysis algorithms.

As the images are acquired when the drawer is under fast motion during drawer insertion, a robust tube slot localization algorithm is desirable to serve as the geometry reference for estimating tube characteristics such as tube height, diameter, and center offset. Although hardware encoders can trigger the cameras at a set of predefined locations, a high-precision encoder is not cost efficient. For a DVS camera setup, the encoder error is desirably less than 0.13 mm in order to achieve less than one pixel error for tray slot localization.

Fiducial Markers

To facilitate accurate estimation of tube characteristics for images acquired under fast motion, embodiments provide high-precision tube sample tray alignment and tube slot localization by using an image-based method that includes utilizing a set of fiducial markers on the tray surface to estimate a distance a tray has traveled with a drawer for each image. Embodiments also include a calibration method for registering the fiducial marker pattern for each DVS camera. Embodiments further include a template matching method for tray alignment and tube slot localization.

Figure 4:
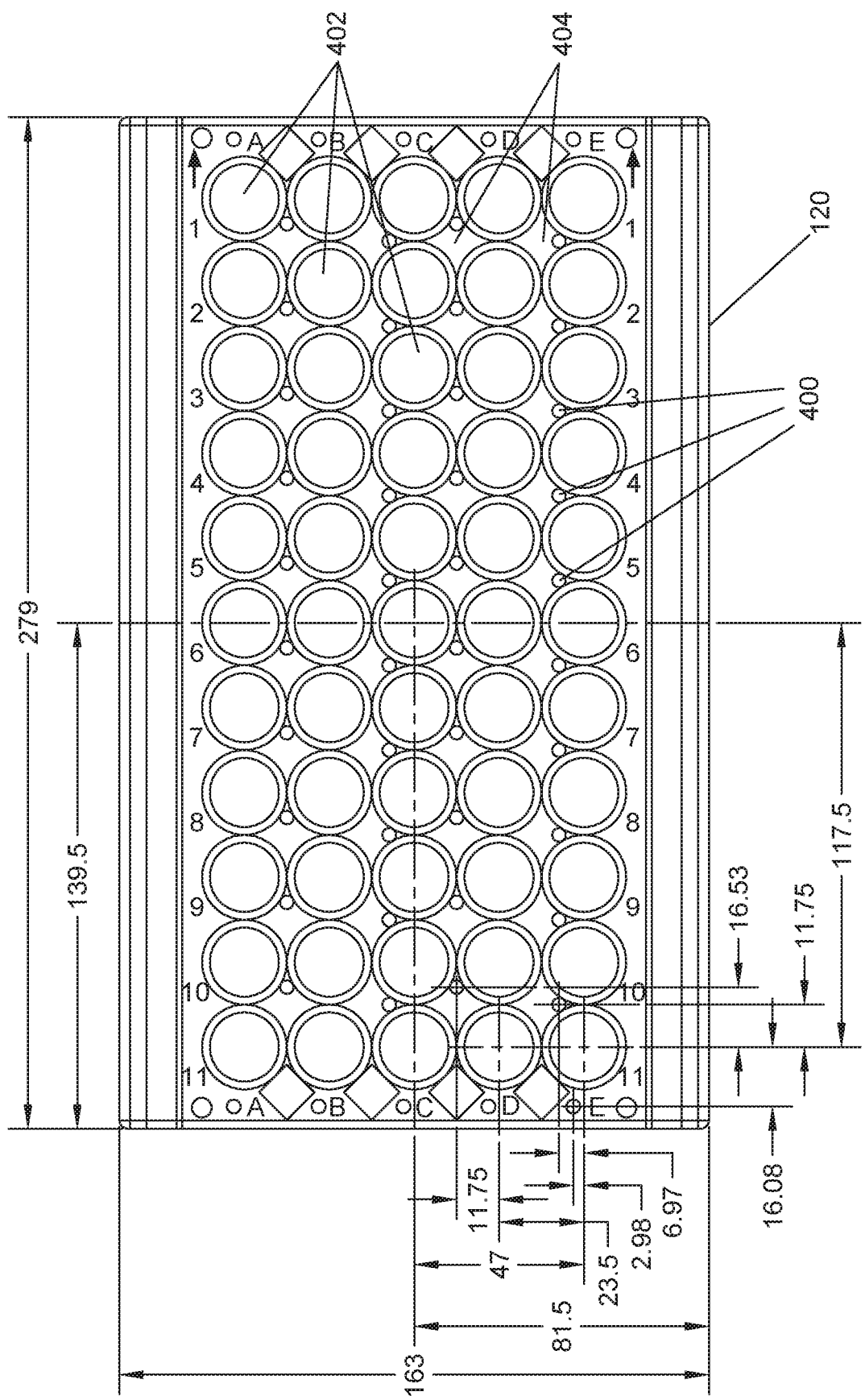
FIG. 4 is a diagram illustrating a top view of an exemplary tray having fiducial markers disposed on the tray between slots, according to an embodiment.

FIG. 4 is a diagram illustrating a top view of an exemplary tray 120 having fiducial markers 400 disposed on the tray 120 between tube slots 402, according to an embodiment. Nearly diamond shaped cross section areas 404 (hereinafter diamond shaped areas) are disposed between sets of 4 adjacent slots 402. As shown in FIG. 4, the tray 120 includes a matrix of 5 columns and 11 rows. The number of slots 402, the number of rows of slots 402 and the number of columns of slots 402 shown in FIG. 4 is merely exemplary. Embodiments may include trays having any number of rows, columns and slots. The dimensions of the tray 120 shown in FIG. 4 are also exemplary. Embodiments may also include trays having dimensions other than those shown in FIG. 4.

By assuming the error of the hardware encoder is less than half of the row length of the tray (e.g., 11.75 mm) 120, a repetitive marker pattern may be used for each row of the tray 120. Various factors may be considered to provide a desirable fiducial marker pattern. For example, the greater the number of fiducial markers 400, the more accurate the tracking result. Therefore, the number of markers 400 available for tracking under possible operating conditions should be maximized. Further, partial occlusions of the markers 400 as well as marker reflections on the tube sides may lead to localization errors and false positives. Therefore, the number of partially visible markers 400 and reflection on the side walls should be minimized.

Figure 5:
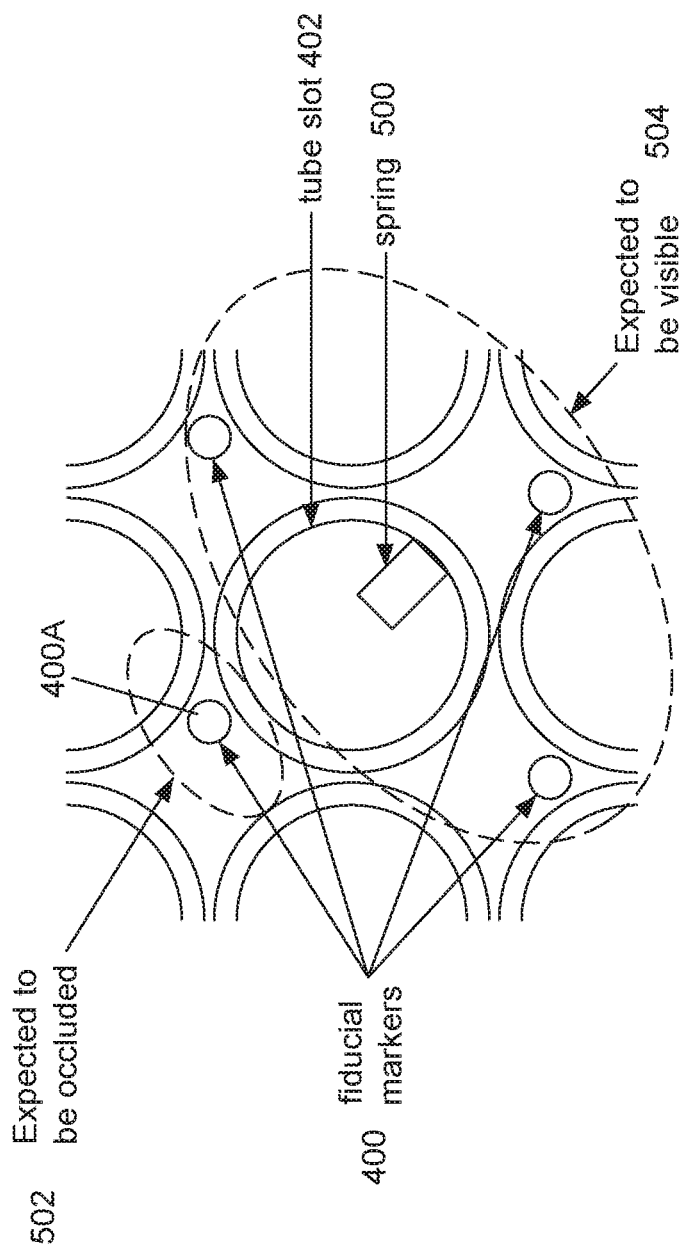
FIG. 5 is a close-up view of a portion of the tray shown in FIG. 4 illustrating location of fiducial markers in the diamond shaped areas adjacent to a slot, according to an embodiment.

FIG. 5 is a close-up view of a portion of the tray shown in FIG. 4 illustrating location of fiducial markers 400 in the diamond shaped areas adjacent to a slot 402, according to an embodiment. As shown in FIG. 5, a tube slot includes a spring 500 that is configured to push a tube 130 held in the tube slot 402 toward one corner of the slot 402 such that the tube is not centered in the tube slot, which may occlude a marker (such as marker 400A in FIG. 5) in a camera's field of view. FIG. 5 shows the area 502 expected to be occluded from the camera's field of view and the area 504 expected to be visible within the camera's field of view. Accordingly, rather than markers being located in the center of each diamond-shaped area 404, the distance between the markers 402 and the center of the tube slot 402 is maximized. With the specific arrangement, at least 3 markers are within a camera's field of view regardless of whether there is a tube in the slot 402 or the slot 402 is empty, thereby providing for tracking within an acceptable accuracy range and eliminating use of further markers. As a result, the number of partially visible markers and reflections on the tube walls may be minimized.

Figures 6A, 6B:
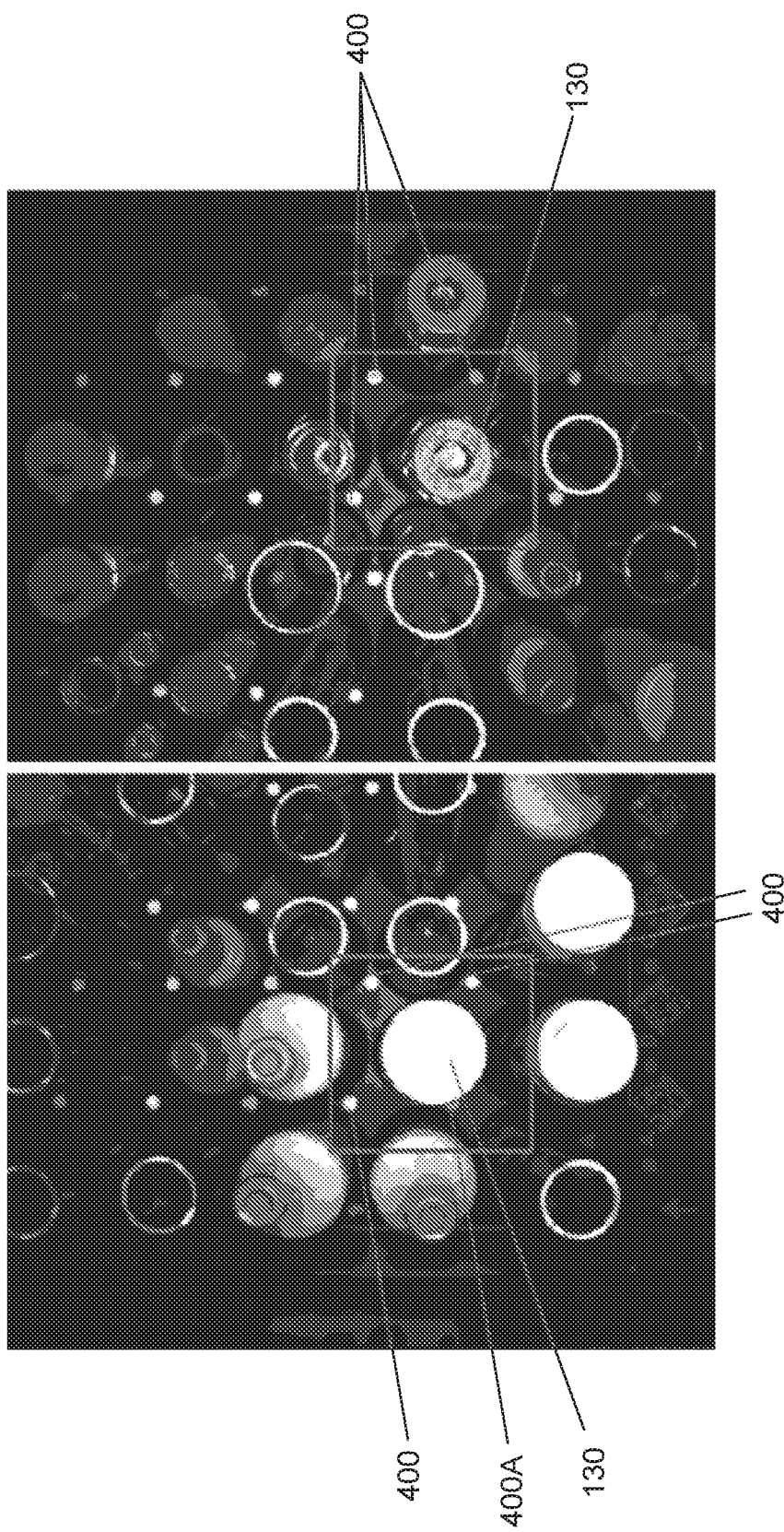
FIG. 6A and FIG. 6B are images from a camera showing three markers within a camera's field of view around a tube, according to an embodiment.

FIG. 6A and FIG. 6B are images from a camera showing three markers 400 within a camera's field of view around a tube 130. As shown in FIG. 6A, three markers 400 are visible within the camera's field of view around tube 130 and one marker 400A is partially occluded from the camera's field of view. As shown in FIG. 6B, three markers 400 are within the camera's field of view around tube 130. The fourth marker is not shown because is completely occluded from the camera's field of view. Embodiments do not make use of marker codification. That is, the pattern repeats with each row.

In one embodiment, the markers 400 may carry additional encoding information. Encoding may be realized by locally varying fiducial marker shape, color, arrangement or any combination of the above. The encoded information may localize in case of a lower resolution hardware encoder or a complete lack of hardware encoding. The encoded information may provide sanity checking against the hardware encoder output. The encoded information may also provide tray identification.

Adding encoding to the fiducial markers may sacrifice the detection robustness. By using identical simple white dots provides added robustness. Even if the dots are damaged by wear, cleaning, or manufacturing defects, an extreme error (e.g., processor determining image is somewhere else in the tray 120). Although the position of a single data point may slightly shift, the shift may be minimized by taking the center of mass of each dot 400 or using robust methods, such as RANSAC, to remove the matching outliers automatically.

Calibration

There are mainly two parts of a Drawer Vision System (DVS) from a software standpoint. One is online parts and the other is offline parts. Online parts means those parts that happened during operation, i.e., when the system processes the new images captured by the camera and when the system is being used for discovering the drawer inventory. The offline part describes, for instance, the calibration phase and also the training. The system needs a large amount of data for training classifier components to detect different tube types. This calibration and the training is something that could be done each time the product is built before it is sent to a customer or at the time of installation. The training part is done once for the DVS, and then that online part of the software would then run for all instances of the DVS. The training is particularly helpful when determining different tube types. Once a scope is defined to determine the tube types which are to be used for the system, images of those tubes can define a collection for the training. The training can be done once at the factory before releasing the product and there may be no need to train it by the customer on premises. It would only have to be updated if new tube types are to be supported. That is something that happens on the manufacturer side. The calibration, which is another offline component, could happen at the customer's site or at the manufacturer of each instance. The training could be run once for the entire system or the entire product line and then the calibration would be run at least once for each individual instance.

Embodiments also include a calibration method for registering the fiducial marker pattern for one or more DVS cameras, such as left camera 242 and right camera 244. Due to the limitations of manufacture and assembly precision, the relative pose of DVS cameras with respect to the drawer could vary from one DVS unit to another. Accordingly, a calibration procedure is used to learn the mapping between the camera coordinate system and the tray coordinate system. Characteristics, such as tube height, are measured from the tray surface and the center offset is measured from each tube slot center.

As the tray is held in the drawer, three coordinate systems are considered for alignment: the camera coordinate system; the tray coordinate system; and the drawer coordinate system. While performing calibration between these three coordinate systems is possible, calibration may be limited to two coordinate systems, the camera coordinate system and tray coordinate system by the following assumptions: (1) one of the tray axes is aligned with the drawer traveling direction, and the axis is coarsely aligned with one of camera's axes; and (2) surfaces of all trays attached to the drawer form a planar surface which is parallel to the drawer surface. Accordingly, one image of an empty 55-slot tray may be used for each camera (242 and 244) to calibrate the camera pose with respect to the tray surface for each tray orientation, given that the intrinsic parameters have been calibrated for the corresponding camera (242 and 244).

Figure 7B:
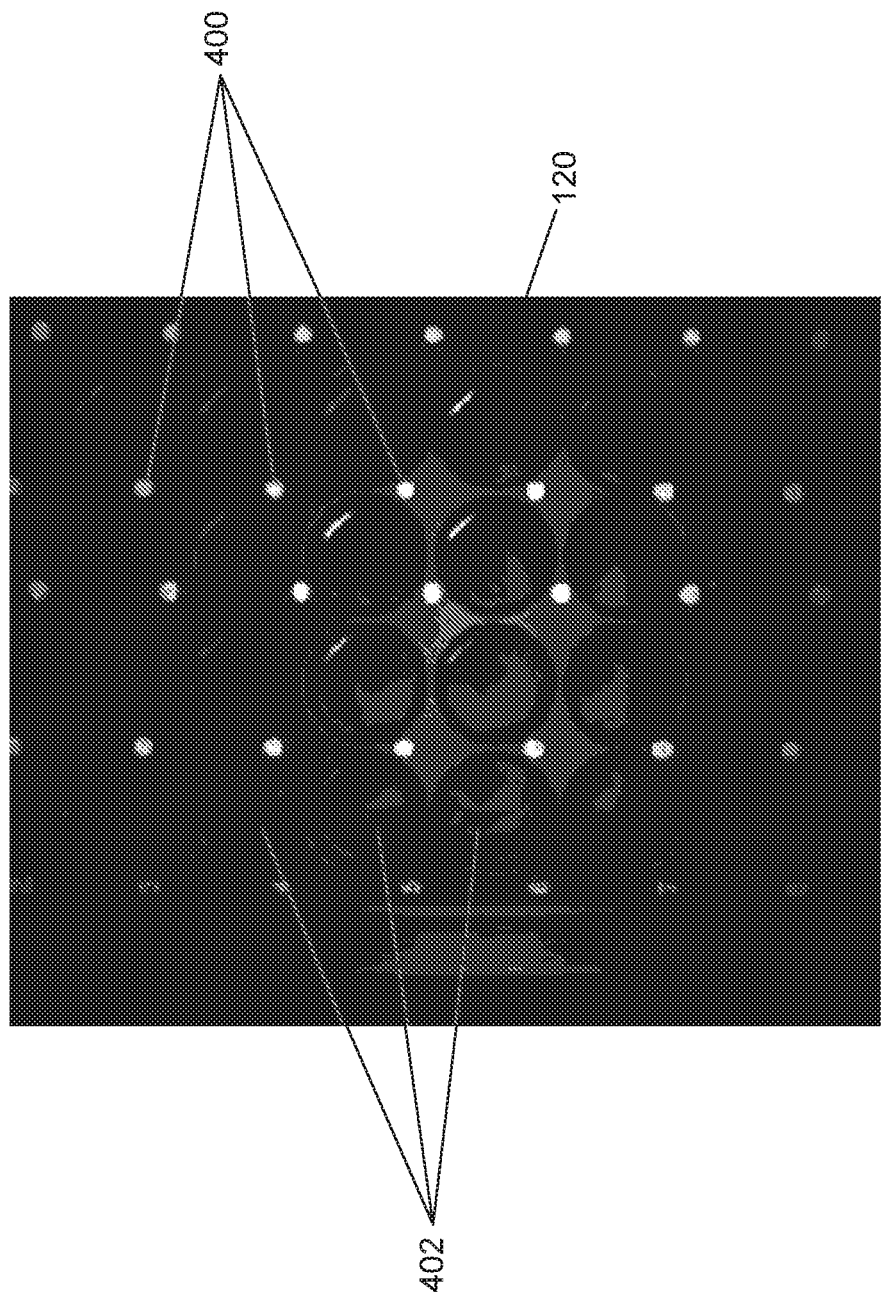
FIG. 7B is an image of a top view of an exemplary tray having fiducial markers disposed between slots for use with embodiments.

FIG. 7A is a diagram illustrating a tray coordinate system superimposed over a top view of an exemplary tray 120 having detected fiducial markers 400 disposed between slots 402 for use with embodiments. As shown in FIG. 7A, the tray coordinate system includes an x-axis and y-axis. FIG. 7B is an image from a camera (e.g., left camera 242) of a top view of an exemplary tray having detected fiducial markers 400 disposed between slots 402 for use with embodiments. The image in FIG. 7B is acquired when the middle row (e.g., the 6th row) of an empty 55-slot tray is in the center of camera's field of view.

Each of the detected fiducial markers 400 in the image is located, for example, using circle detection with a Hough transform. When the tray coordinate system is pre-aligned (e.g., coarsely aligned) with the camera coordinate system, the detected markers 400 may be grouped into four clusters according to their x-coordinates. For example, in the embodiment shown in FIG. 7A, the tray coordinate system's y-axis may be pre-aligned with the camera coordinate system's y-axis. Embodiments may include other ways of pre-aligning the tray coordinate system with the camera coordinate system, such as for example, pre-aligning the tray coordinate system's x-axis with the camera coordinate system's x-axis. The detected markers 400 in each cluster lay in a line 802 in the y-direction which is parallel to the other lines 802 in the y-direction formed by the other clusters. Therefore, linear regression may be performed to fit a set of parallel lines 802 (shown in FIG. 8A and FIG. 8B) to the positions of the detected markers 400. Similarly, linear regression may be performed to fit parallel lines in the x-direction with slight modifications. The detected markers 400 on the odd columns are located at the top corner of each diamond shaped area 404, while detected markers 400 on the even columns are located at the right corner of each diamond shaped area 404. Therefore, markers on the same row form a pair of parallel lines 804 (shown in FIG. 8A and FIG. 8B) and they are parallel to the pairs of lines 804 formed by markers 400 on other rows.

Figure 8B:
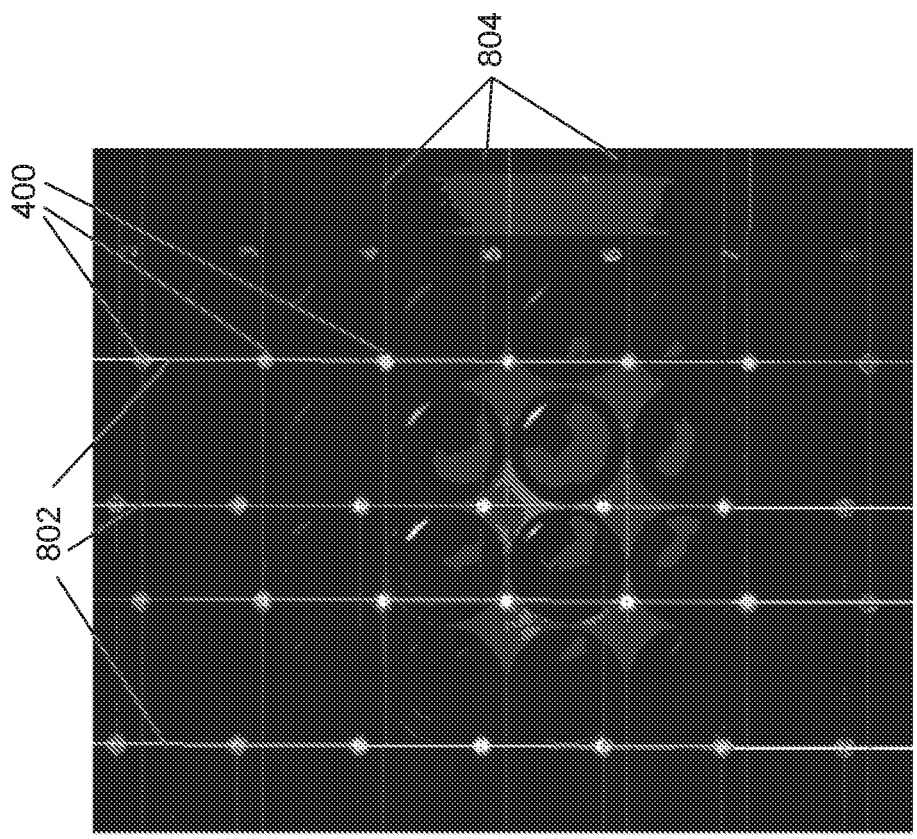
FIG. 8A and FIG. 8B show the detected markers and the parallel lines derived from regression on images acquired from the left camera and the right camera.
Figure 8A:
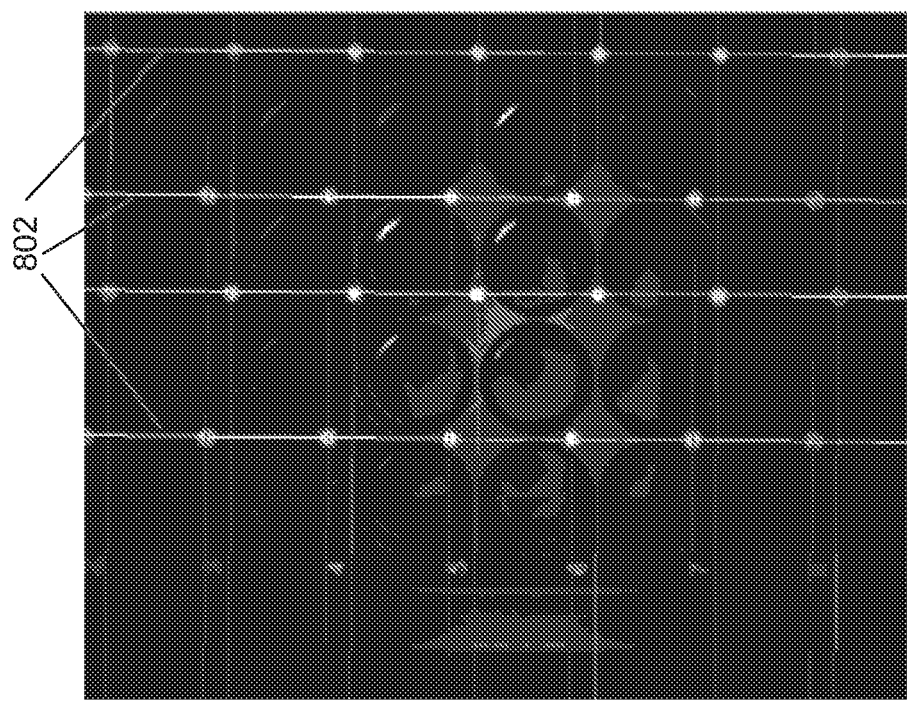

FIG. 8A and FIG. 8B show the detected markers 400 and the parallel lines 802 derived from regression on images acquired from the left camera 242 and the right camera 244. Given that the 6th row is in the center of camera's field of view and given the physical placement of the marker pattern on the tray surface, the 3D correspondence of each detected marker 400 to the physical position on the tray surface may be identified. With the 3D and 2D correspondences, $\{P_i\}$ and $\{p_i\}$, the camera pose may be derived by minimizing the re-projection errors:

$$R, t = \text{argmin}_{R,t} \Sigma i \| p_i - f(RP_i + t, K_c, d_c) \| 2,$$

where $f( )$ is the 3D to 2D projection function from camera coordinate system to its image plane, $K_c$ is the intrinsic calibration matrix containing the focal length and skew of camera's two axes and the principal point on the image, and $d_c$ is its lens distortion vector. The rotation matrix R and translation vector t are the extrinsic parameters describing the pose of the camera image. The optimization may, for example, be implemented using OpenCV API.

Tray Alignment

FIG. 9A and FIG. 9B are exemplary images of a top view of a tube tray and tubes illustrating an offset between projected markers 900 and the detected markers 902, according to an embodiment. When the fiducial marker pattern has been calibrated, the camera pose provides the mapping of any point from the tray coordinate system to the camera coordinate system. As trays 120 are moving along with the drawer 110 and the hardware encoder 210 roughly triggers the camera 242, 244 (e.g., left camera 242 or right camera 244) when each row of the tray 120 is at the center of camera's field of view, 2D projections 900 of each detected fiducial marker 902 may be predicted based on current tray configuration (e.g., tray types, orientation, and position) on the drawer 110 and the encoder information. In this way, the projected markers 900 (shown in FIG. 9A and FIG. 9B) may serve as a template to match the detected markers 902 on the image by nearest neighbor search. The offset between the projected markers 900 and detected marker 902 indicates an amount translation to compensate due to the inaccuracy of the hardware encoder 210. Accordingly, a location of the tray 120 may be determined to align the tray 120 and tube slots 402 that fall in the camera's field of view.

In some embodiments, offsets may be within 10 pixels in both x and y directions. Embodiments may, however, include offsets of any number of pixels.

When the tray 120 has been aligned, tube slot localization may be determined by defining tube slot grid points at the center of each diamond shaped area 404 of the tray surface and projecting the compensated tube slot grid points onto the image to locate the tray slot 402 based on the offset obtained from the tray alignment.

Figure 10B:
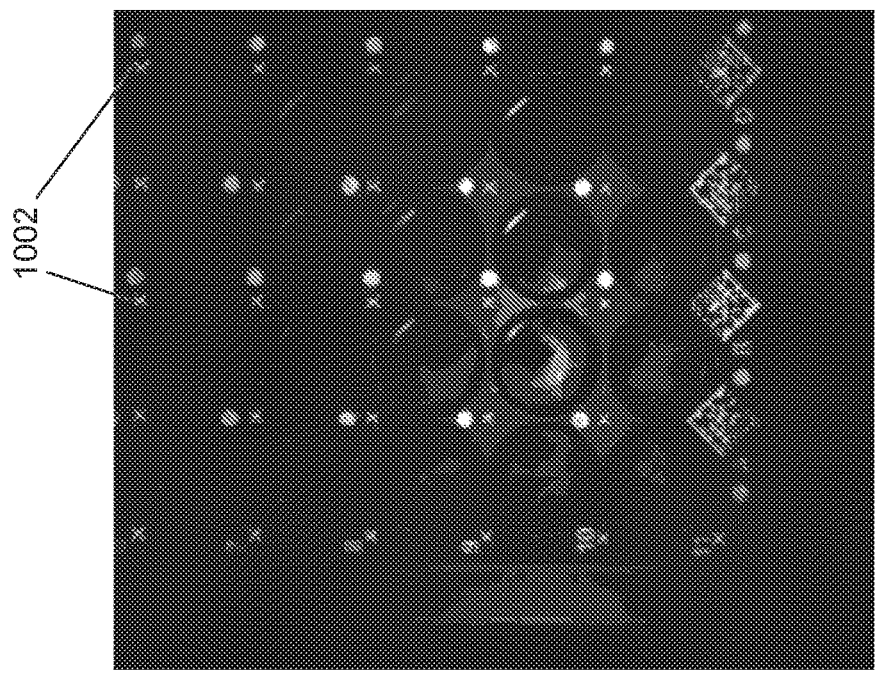
FIG. 10B shows the tube slot grid points 1002 superimposed over an image of a top view of a tray.
Figure 10A:
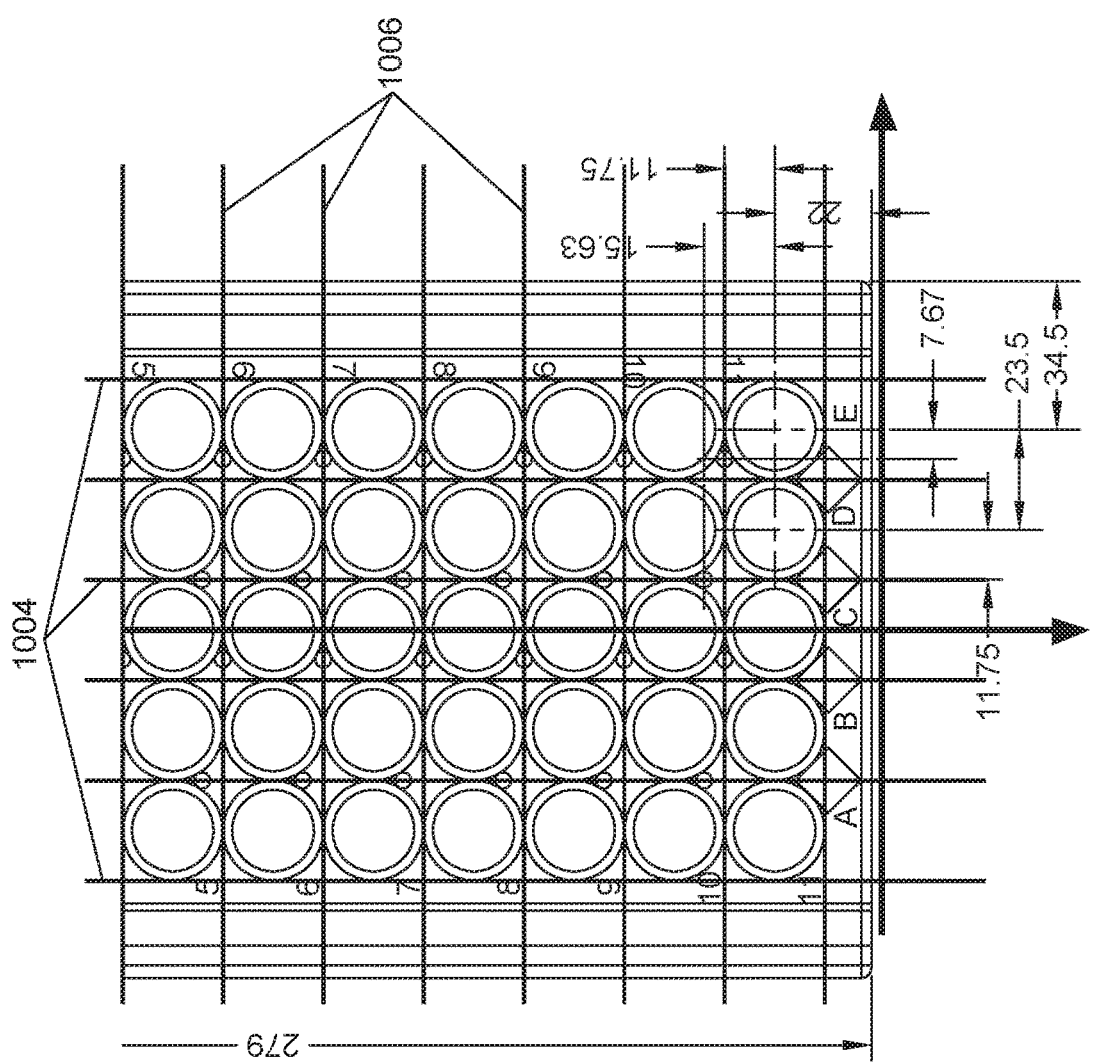
FIG. 10A is a diagram illustrating the y-axis lines and x-axis lines determined from the tube slot grid points derived during calibration.

FIG. 10A is a diagram illustrating the y-axis lines 1004 and x-axis lines 1006 determined from the tube slot grid points 1002 derived during calibration. The y-axis lines 1004 and x-axis lines 1006 connect tube slot grid points 1002 shown in FIG. 10B.

FIG. 10B shows the tube slot grid points 1002 superimposed over an image of a top view of a tray. With these grid points 1002, each tube slot 402 may be extracted from the input image and image analytics may be performed for various tasks such as tube occupancy detection, tube categorization, and tube characterization.

Figure 11:
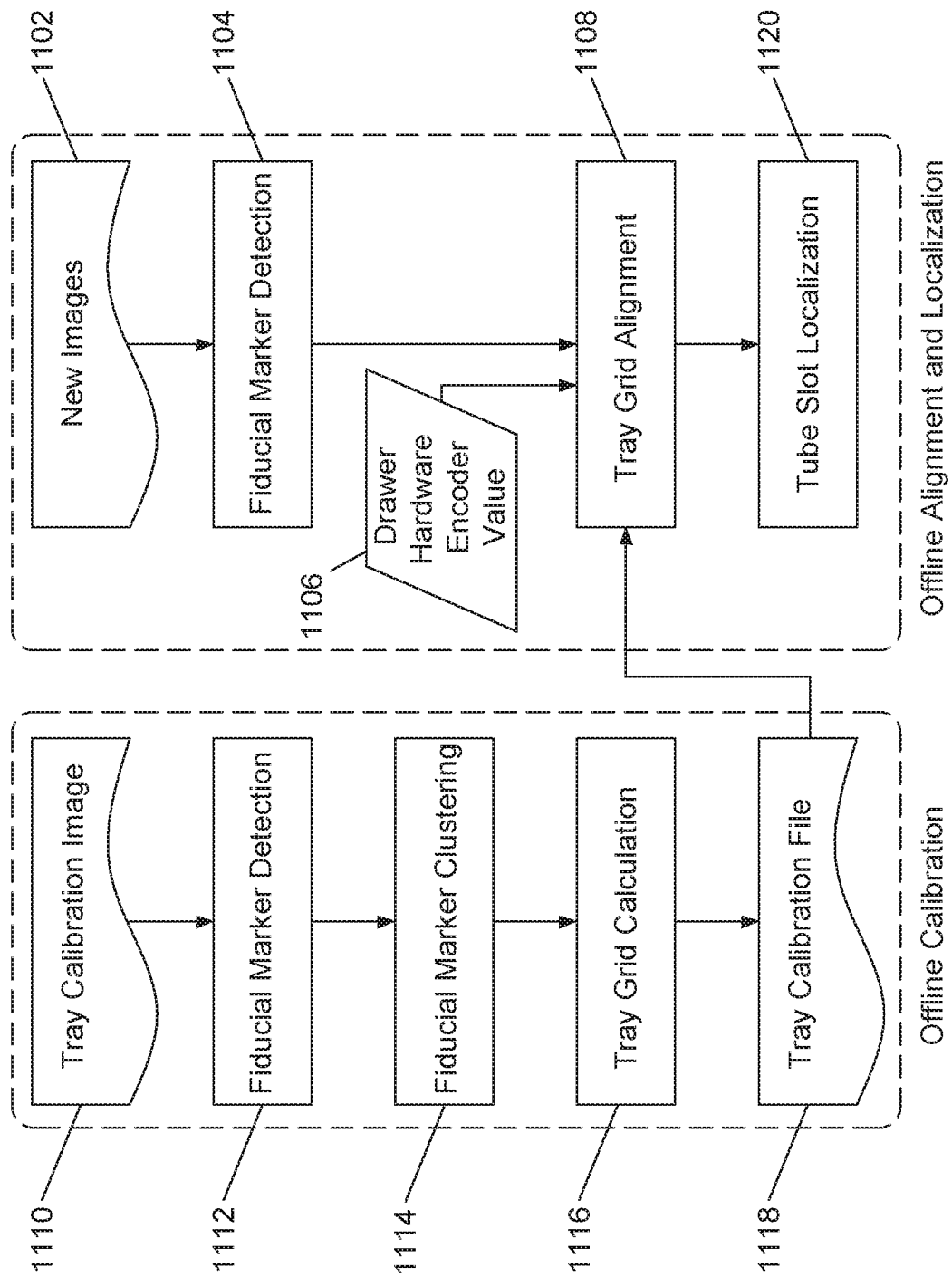
FIG. 11 is a flowchart illustrating a method of tray grid alignment and tube slot localization using tray grid calibration, according to embodiments disclosed herein.

FIG. 11 is a flowchart illustrating a method of tray grid alignment and tube slot localization using tray grid calibration, according to embodiments disclosed herein. As shown in FIG. 11, the method includes acquiring one or more new images of a tray at step 1102 and detecting fiducial markers 400 located on the tray at step 1104. As shown in step 1106, a value (e.g., a value indicating when each row of the tray 120 is at the center of camera's field of view) is received by the drawer hardware encoder 210.

At step 1108, the tray 120 may be aligned as described above using the offset between the projected markers 900 and the detected markers 902. The projected markers 900 are predicted based on the acquired encoder information from 1106 and the current tray's configuration (e.g., tray types, orientation, and position) on the drawer 110 determined via the offline calibration information (e.g., information identifying a correspondence of each detected fiducial marker to a physical position on the tray, and/or information identifying the fiducial marker pattern) that may be stored in tray calibration file at 1118. The offset between the projected markers 900 and detected marker 902 indicates an amount translation to compensate due to the inaccuracy of the hardware encoder 210. Accordingly, a location of the tray 120 may be determined to align the tray 120 and tube slots 402 that fall in the camera's field of view.

The offline calibration indicating the current tray's configuration on the drawer 110 may be determined as described above. For example, a tray calibration image (e.g., image shown in FIG. 7B) is acquired at step 1110 and fiducial markers 400 are detected at step 1112.

The detected markers 902 may be grouped into clusters at step 1114 and the tray grid may then be calculated at step 1116. For example, the detected markers 902 may be grouped into four clusters according to their x-coordinates shown in FIG. 8A. As described above, the tray grid may be calculated from the fitted parallel lines 802 to the position of the detected clustered markers 902 along their x-coordinates and fitting pairs of parallel lines 804 to the position of the detected markers 902 on each row along their y-coordinates. The tray is then calibrated by identifying a correspondence of each detected fiducial marker to a physical position on the tray. The camera pose may then provide mapping of any point from the tray coordinate system to the camera coordinate system. Calibration information (e.g., information identifying a correspondence of each detected fiducial marker to a physical position on the tray) may be stored, for example, in a tray calibration file, as shown in step 1118 and used to align the tray at 1108.

When the tray 120 is aligned at step 1108, the tube slot localization may be determined at step 1120. For example, tube slot localization may be determined by defining tube slot grid points 1002 at the center of each diamond shaped area 404 of the tray surface and projecting the compensated tube slot grid points 1002 onto the image to locate the tray slot 402 based on the offset obtained from the tray alignment. With these grid points 1002, tube slot image patches for each tube slot 402 may be extracted from the input image and image analytics may be performed for various tasks such as tube occupancy detection, tube categorization, and tube characterization.

Figure 12:
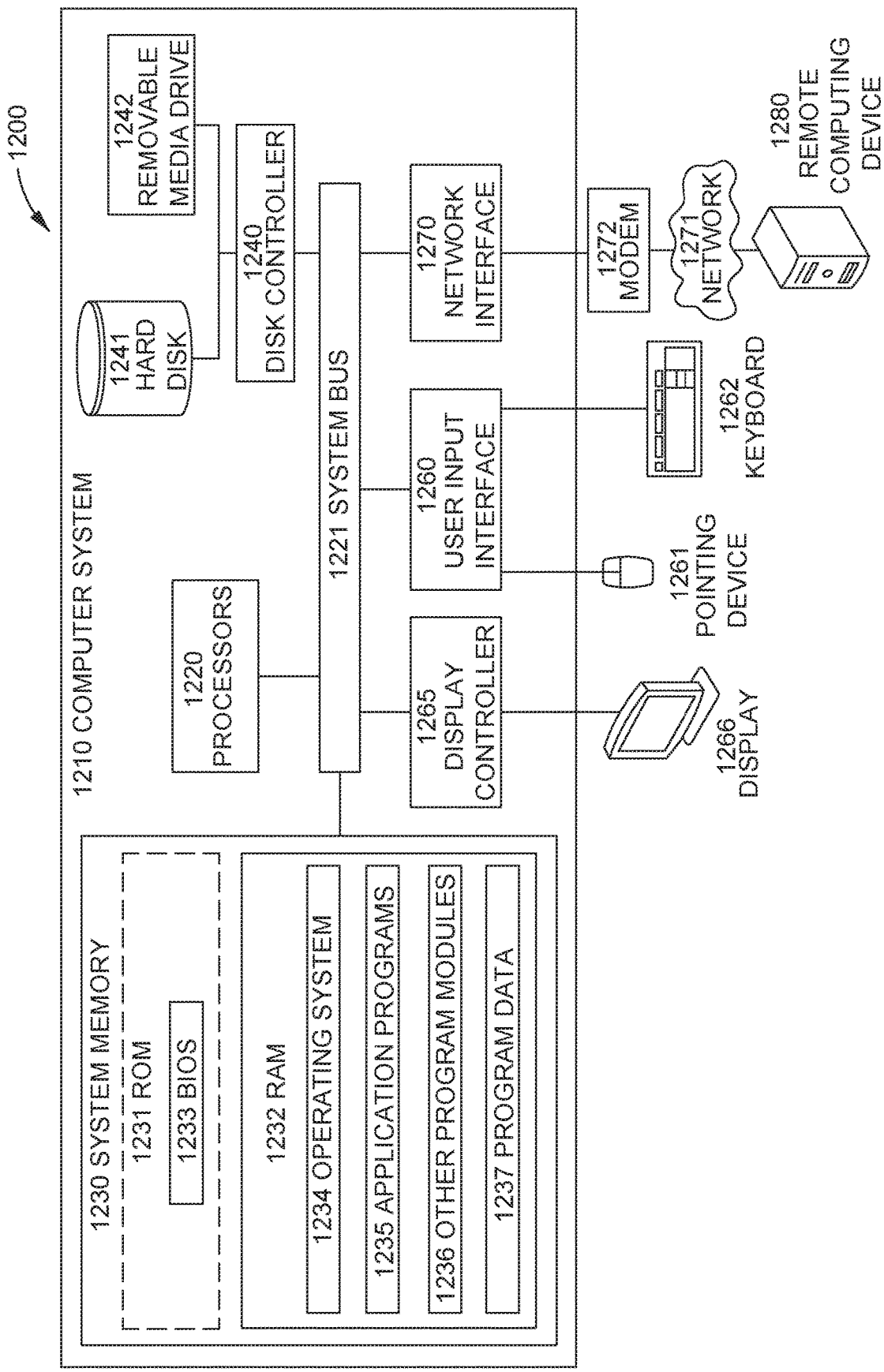
FIG. 12 illustrates an example of a computing environment within which embodiments of the invention may be implemented.

FIG. 12 illustrates an example of a computing environment 1200 within which embodiments of the invention may be implemented. Computing environment 1200 may be implemented as part of any component described herein. Computing environment 1200 may include computer system 1210, which is one example of a computing system upon which embodiments of the invention may be implemented. As shown in FIG. 12, the computer system 1210 may include a communication mechanism such as a bus 1221 or other communication mechanism for communicating information within the computer system 1210. The system 1210 further includes one or more processors 1220 coupled with the bus 1221 for processing the information. The processors 1220 may include one or more CPUs, GPUs, or any other processor known in the art.

The computer system 1210 also includes a system memory 1230 coupled to the bus 1221 for storing information and instructions to be executed by processors 1220. The system memory 1230 may include computer readable storage media in the form of volatile and/or nonvolatile memory, such as read only memory (ROM) 1231 and/or random access memory (RAM) 1232. The system memory RAM 1232 may include other dynamic storage device(s) (e.g., dynamic RAM, static RAM, and synchronous DRAM). The system memory ROM 1231 may include other static storage device(s) (e.g., programmable ROM, erasable PROM, and electrically erasable PROM). In addition, the system memory 1230 may be used for storing temporary variables or other intermediate information during the execution of instructions by the processors 1220. A basic input/output system 1233 (BIOS) containing the basic routines that help to transfer information between elements within computer system 1210, such as during start-up, may be stored in ROM 1231. RAM 1232 may contain data and/or program modules that are immediately accessible to and/or presently being operated on by the processors 1220. System memory 1230 may additionally include, for example, operating system 1234, application programs 1235, other program modules 1236 and program data 1237.

The computer system 1210 also includes a disk controller 1240 coupled to the bus 1221 to control one or more storage devices for storing information and instructions, such as a magnetic hard disk 1241 and a removable media drive 1242 (e.g., floppy disk drive, compact disc drive, tape drive, and/or solid state drive). The storage devices may be added to the computer system 1210 using an appropriate device interface (e.g., a small computer system interface (SCSI), integrated device electronics (IDE), Universal Serial Bus (USB), or FireWire).

The computer system 1210 may also include a display controller 1265 coupled to the bus 1221 to control a display or monitor 1266, such as a cathode ray tube (CRT) or liquid crystal display (LCD), for displaying information to a computer user. The computer system 1210 includes a user input interface 1260 and one or more input devices, such as a keyboard 1262 and a pointing device 1261, for interacting with a computer user and providing information to the processor 1220. The pointing device 1261, for example, may be a mouse, a trackball, or a pointing stick for communicating direction information and command selections to the processor 1220 and for controlling cursor movement on the display 1266. The display 1266 may provide a touch screen interface which allows input to supplement or replace the communication of direction information and command selections by the pointing device 1261.

The computer system 1210 may perform a portion or all of the processing steps of embodiments of the invention in response to the processors 1220 executing one or more sequences of one or more instructions contained in a memory, such as the system memory 1230. Such instructions may be read into the system memory 1230 from another computer readable medium, such as a hard disk 1241 or a removable media drive 1242. The hard disk 1241 may contain one or more data stores and data files used by embodiments of the present invention. Data store contents and data files may be encrypted to improve security. The processors 1220 may also be employed in a multi-processing arrangement to execute the one or more sequences of instructions contained in system memory 1230. In alternative embodiments, hard-wired circuitry may be used in place of or in combination with software instructions. Thus, embodiments are not limited to any specific combination of hardware circuitry and software.

As stated above, the computer system 1210 may include at least one computer readable medium or memory for holding instructions programmed according to embodiments of the invention and for containing data structures, tables, records, or other data described herein. The term "computer readable medium" as used herein refers to any non-transitory, tangible medium that participates in providing instructions to the processor 1220 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1241 or removable media drive 1242. Non-limiting examples of volatile media include dynamic memory, such as system memory 1230. Non-limiting examples of transmission media include coaxial cables, copper wire, and fiber optics, including the wires that make up the bus 1221. Transmission media may also take the form of acoustic or light waves, such as those generated during radio wave and infrared data communications.

The computing environment 1200 may further include the computer system 1210 operating in a networked environment using logical connections to one or more remote computers, such as remote computer 1280. Remote computer 1280 may be a personal computer (laptop or desktop), a mobile device, a server, a router, a network PC, a peer device or other common network node, and typically includes many or all of the elements described above relative to computer 1210. When used in a networking environment, computer 1210 may include modem 1272 for establishing communications over a network 1271, such as the Internet. Modem 1272 may be connected to system bus 1221 via network interface 1270, or via another appropriate mechanism.

Network 1271 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1210 and other computers (e.g., remote computing system 1280). The network 1271 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1271.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication there-between. Computer program instructions may be loaded onto a computer, including without limitation, a general purpose computer or special purpose computer, or other programmable processing apparatus to produce a machine, such that the computer program instructions which execute on the computer or other programmable processing apparatus create means for implementing the functions specified in the block(s) of the flowchart(s). A user interface processor or generator is a known element comprising electronic circuitry or software or a combination of both for generating display elements or portions thereof. A user interface (UI) comprises one or more display elements enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A graphical user interface (GUI), as used herein, comprises one or more display elements, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the elements for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display elements in response to signals received from the input devices. In this way, the user interacts with the display elements using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

A workflow processor, as used herein, processes data to determine tasks to add to, or remove from, a task list or modifies tasks incorporated on, or for incorporation on, a task list, as for example specified in a program(s). A task list is a list of tasks for performance by a worker, user of a device, or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and may include an event monitor. A processor in the workflow engine tracks which processes are running, for which patients, physicians, and what step needs to be executed next, according to a process definition and may include a procedure for notifying physicians of a task to be performed.

The system and processes of the figures presented herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking the units of FIG. 12. Any of the functions and steps provided in the Figures may be implemented in hardware, software or a combination of both. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of tray calibration using a tray coordinate system having an x-axis and a y-axis and a camera coordinate system having an x-axis and a y-axis, the method comprising:
    acquiring an image of a tray, the tray comprising a plurality of tube slots arranged in a matrix of rows and columns, each tube slot configured to receive a sample tube, the image of the tray being acquired via a camera;
    detecting, using a processor, a plurality of fiducial markers disposed on cross sectional areas between the tube slots on the tray;
    pre-aligning the tray coordinate system with the camera coordinate system;
    calculating, using the processor, a tray grid by fitting parallel lines to positions of markers along their x-coordinates of the tray coordinate system and fitting pairs of parallel lines to positions of the markers on each row along their y-coordinates of the tray coordinate system, including performing linear regression to fit the parallel lines to positions of the markers along their x-coordinates of the tray coordinate system and to fit the pairs of parallel lines to positions of the markers on each row along their y-coordinates of the tray coordinate system; and
    calibrating, using the processor, the tray by identifying a correspondence of each detected fiducial marker to a physical position on the tray to provide mapping of the tray coordinate system to the camera coordinate system.

2. The method of claim 1, wherein the tray is configured to fit within a portion of a drawer movable between an open position and a closed position and the image of the tray is acquired via the camera as the drawer is moved between the open and the closed position.

3. The method of claim 1, further comprising:
    acquiring another image of the tray via another camera, the other camera being adjacent the camera and having another camera coordinate system;
    pre-aligning the tray coordinate system with the other camera coordinate system; and
    identifying the correspondence of each detected fiducial marker to the physical position on the tray to provide mapping of the tray coordinate system to the other camera coordinate system.

4. The method of claim 1, wherein calculating the tray grid further comprises:
    grouping detected markers into clusters along their x-coordinates of the tray coordinate system, wherein the detected markers in each cluster lay in a line in the y-direction of the tray coordinate system which is parallel to the other lines in the y-direction of the tray coordinate system formed by the other clusters.

5. The method of claim 1, wherein the plurality of fiducial markers are white dots.

6. The method of claim 1, wherein
    the cross sectional areas are near diamond shaped areas, and
    fiducial markers on each row of the near diamond shaped area comprise top corner fiducial markers located at the top corner of alternating diamond shaped areas and right corner fiducial markers located at the right corner of alternating diamond shaped areas.

7. The method of claim 1, further comprising using the correspondence of each detected fiducial marker to the physical position on the tray to align the tray during online operation.

8. A method of tray calibration using a tray coordinate system having an x-axis and a y-axis and a camera coordinate system having an x-axis and a y-axis, the method comprising:
    acquiring an image of a tray, the tray comprising a plurality of tube slots arranged in a matrix of rows and columns, each tube slot configured to receive a sample tube, the image of the tray being acquired via a camera;
    detecting, using a processor, a plurality of fiducial markers disposed on cross sectional areas between the tube slots on the tray;
    pre-aligning the tray coordinate system with the camera coordinate system;
    calculating, using the processor, a tray grid by fitting parallel lines to positions of markers along their x-coordinates of the tray coordinate system and fitting pairs of parallel lines to positions of the markers on each row along their y-coordinates of the tray coordinate system;
    calibrating, using the processor, the tray by identifying a correspondence of each detected fiducial marker to a physical position on the tray to provide mapping of the tray coordinate system to the camera coordinate system,
    wherein calibrating the tray further comprises deriving a pose of the camera by minimizing re-projection errors according to:

$R,t = \mathrm{argmin}_{R,t} \Sigma i \| p_i - f(RP_i + t, K_c, d_c) \|^2$, where $\{P_i\}$ and $\{p_i\}$ are the 3D and 2D correspondences, $f()$ is the 3D to 2D projection function from camera coordinate system to its image plane, $K_c$ is the intrinsic calibration matrix containing the focal length and skew of the camera axis and the principal point on the image, $d_c$ is its lens distortion vector, and the rotation matrix R and translation vector t are the extrinsic parameters describing the pose of the camera image.

9. A method of tube slot localization using a tray coordinate system and a camera coordinate system, comprising:
receiving, using a processor, a series of images from at least one camera of a tray, the tray comprising tube slots arranged in a matrix of rows and columns, each tube slot configured to receive a sample tube, the series of images of the tray being acquired via the at least one camera;
automatically detecting, using the processor, a plurality of fiducial markers disposed on cross sectional areas between the tube slots on the tray;
receiving, using the processor, an encoder value indicating when each row of the tray is substantially at the center of the camera's field of view;
determining, using the processor, calibration information to provide mapping of locations from the tray coordinate system to locations from the camera coordinate system, wherein the calibration information indicates the tray's type, the tray's orientation and the tray's position; and
automatically aligning, using the processor, the tray based on the encoder value and calibration information, including:
predicting locations of fiducial markers based on the encoder value and the calibration information;
automatically determining an offset between the projected locations of the markers and the locations of the detected marker; and
automatically compensating for the offset to align the tray and tube slots that fall in the at least one camera's field of view.

10. The method of claim 9, wherein the tray is configured to fit within a portion of a drawer movable between an open and a closed position and the image of the tray is acquired via the at least one camera as the drawer is moved between the open position and the closed position.

11. The method of claim 9, wherein the calibration information indicates correspondence of each detected fiducial marker to a physical position on the tray.

12. The method of claim 9, further comprising:
defining tube slot grid points at the center of each of the cross sectional areas; and
projecting compensated tube slot grid points onto one or more of the series of images to locate the tube slots based on the determined offset.

13. The method of claim 9, further comprising:
extracting data corresponding to each tube slot from one or more of the series of images to determine at least one of: whether a tube occupies one of the tube slots and a tube type.

14. A vision system for use in an in vitro diagnostics environment comprising:
a tray comprising:
a plurality of tube slots arranged in a matrix of rows and columns, each tube slot configured to receive a sample tube;
a plurality of cross sectional areas located between the plurality of tube slots; and
a plurality of fiducial markers disposed on the cross sectional areas;
a surface configured to receive the tray;
at least one camera configured to capture a series of images of the tray positioned on the surface;
an encoder configured to generate an encoder value indicating when each row of the tray is substantially at the center of the at least one camera's field of view; and
a processor configured to:
receive the series of images of the tray from the at least one camera;
automatically detect a plurality of fiducial markers disposed on cross sectional areas between the tube slots on the tray;
receive the encoder value;
generate calibration information to provide mapping of locations from a tray coordinate system to locations from a camera coordinate system; and
automatically align the tray based on the encoder value and calibration information.

15. The system of claim 14, wherein the surface comprises a portion of a drawer movable between an open and a closed position and the image of the tray is acquired via the at least one camera as the drawer is moved between the open position and the closed position.

16. The system of claim 14, wherein
each cross sectional area is a near diamond shaped area and each near diamond shaped area is disposed between four of the plurality tube slots, and
fiducial markers on each row of the near diamond shaped areas comprise top corner fiducial markers located at the top corner of alternating diamond shaped areas and right corner fiducial markers located at the right corner of alternating diamond shaped areas.

17. The system of claim 14, wherein the processor is further configured to determine calibration information to provide mapping of locations from the tray coordinate system to locations from the camera coordinate system by:
detecting the plurality of fiducial markers disposed on the cross sectional areas between the tube slots on the tray;
pre-aligning the tray coordinate system with the camera coordinate system;
calculating a tray grid by fitting parallel lines to positions of markers along their x-coordinates of the tray coordinate system and fitting pairs of parallel lines to positions of the markers on each row along their y-coordinates of the tray coordinate system; and
determining calibrating information by identifying a correspondence of each detected fiducial marker to a physical position on the tray.

18. A tray configured to be held on a surface for use with a vision system, comprising:
a plurality of tube slots arranged in a matrix of rows and columns, each tube slot configured to receive a sample tube;
a plurality of near diamond shaped areas, each near diamond shaped area disposed between four of the plurality tube slots; and
a plurality of fiducial markers, each fiducial marker disposed on one of the near diamond shaped areas in an off-center position with respect to the one of the near diamond shaped areas.

19. The tray of claim 18, wherein fiducial markers on each row of the near diamond shaped areas comprise top corner fiducial markers having centers located at the top corner of alternating diamond shaped areas and right corner fiducial markers having centers located at the right corner of alternating diamond shaped areas.

20. The tray of claim 18, further comprising a plurality of spring force elements, each spring force element coupled to a tube slot and configured to exert a force on the sample tube such that the tube is not centered in the tube slot,
wherein the fiducial markers are disposed on the tray in a pattern such that at least three fiducial markers adjacent to each one of the tube slots is within a field of view of a camera when a sample tube is in the corresponding tube slot.

\* \* \* \* \*